United States Patent
Leek et al.

(10) Patent No.: US 7,168,343 B2
(45) Date of Patent: Jan. 30, 2007

(54) LIMITED ACCESS BUILDING CONNECTION

(75) Inventors: William F. Leek, Carmel, CA (US); Gregory S. Powell, Paso Robles, CA (US)

(73) Assignee: Simpson Strong-tie Company, Inc., Pleasanton, CA (US)

(*) Notice: Subject to any disclaimer, the term of this patent is extended or adjusted under 35 U.S.C. 154(b) by 0 days.

(21) Appl. No.: 11/075,475

(22) Filed: Mar. 9, 2005

(65) Prior Publication Data

US 2006/0201285 A1    Sep. 14, 2006

(51) Int. Cl.
B25B 13/48    (2006.01)
(52) U.S. Cl. .................. 81/176.1; 81/121.1; 81/488; 81/176.1; 52/704
(58) Field of Classification Search ............... 81/121.1, 81/176.1, 488; 52/704–711, 169.9, 233
See application file for complete search history.

(56) References Cited

U.S. PATENT DOCUMENTS

| | | |
|---|---|---|
| 179,994 A | 7/1876 | Brallier |
| 487,721 A | 12/1892 | De Kalb |
| 518,165 A | 4/1894 | Thalaker |
| 560,554 A | 5/1896 | Wiestner |
| 581,551 A | 4/1897 | Green |
| 582,424 A | 5/1897 | Hunt |
| 856,868 A | 6/1907 | Heffner |
| 1,306,553 A | 6/1919 | Morrison |
| 1,344,417 A | 6/1920 | Lovekin |
| 1,347,687 A | 7/1920 | Ellis et al. |
| 1,374,713 A | 4/1921 | Bell |
| 1,528,691 A | 3/1925 | Price et al. |
| 1,589,307 A | 6/1926 | Svebilius |
| 1,737,543 A | 11/1929 | Mason |
| 1,746,978 A | 2/1930 | Winkler |

(Continued)

FOREIGN PATENT DOCUMENTS

CA    2313735    7/2000

(Continued)

OTHER PUBLICATIONS

Description of Claims raised in *Simpson Manufacturing Co., Inc. and Simpson Strong-Tie Company, Inc. v. Alfred D. Commins and Commins Manufacturing, Inc.* USDC, No. Dist. of Calif. Case No. C03-0115 (2 pages).

(Continued)

*Primary Examiner*—Leed D. Wilson
*Assistant Examiner*—Robert Scruggs
(74) *Attorney, Agent, or Firm*—Law Offices of James R. Cypher

(57) ABSTRACT

A limited access building connection for connecting a holding structure and a held structure which includes an anchor member having a threaded end adapted for connection to holding structure. A nut having an inner threaded wall threadably engages the threaded end of anchor member. Nut has a base which engages connector structure. Connector structure is adapted for connection to held structure. A nut rotational member is provided for imparting rotational motion to nut. Connection has dimensional limited access parameters existent between nut and connector structure and held structure. A linear power member is dimensioned and configured to work within the dimensional limited access parameters and is adapted for engaging and imparting rotational energy to nut rotational member.

1 Claim, 11 Drawing Sheets

U.S. PATENT DOCUMENTS

| | | | |
|---|---|---|---|
| 1,953,354 A | 4/1934 | Holland-Letz | |
| 1,966,780 A | 7/1934 | Wyrick | |
| 2,021,051 A | 11/1935 | Desbrueres | |
| 2,066,541 A | 1/1937 | Schenk | |
| 2,187,399 A | 1/1940 | Hopkins | |
| 2,261,537 A | 11/1941 | Zamara | |
| 2,294,745 A * | 9/1942 | Goetz | 74/424.75 |
| 2,357,595 A | 9/1944 | McPherson | |
| 2,405,889 A | 8/1946 | Kennedy | |
| 2,587,560 A | 2/1952 | Widmer | |
| 2,623,427 A | 12/1952 | Ornstein | |
| 2,685,812 A * | 8/1954 | Dmitroff | 411/7 |
| 2,733,745 A | 2/1956 | Norwood | |
| 2,896,496 A | 7/1959 | Jansen | |
| 3,104,645 A | 9/1963 | Harrison | |
| 3,115,804 A | 12/1963 | Johnson | |
| 3,124,983 A | 3/1964 | Emerzian | |
| 3,157,215 A | 11/1964 | Zahodiakin | |
| 3,161,174 A | 12/1964 | Harrison | |
| 3,174,386 A | 3/1965 | Lewis | |
| 3,187,621 A | 6/1965 | Turner | |
| 3,200,676 A | 8/1965 | Pagel | |
| 3,285,120 A | 11/1966 | Kartiala | |
| 3,306,154 A | 2/1967 | Bailey | |
| 3,429,092 A | 2/1969 | Perry et al. | |
| 3,440,334 A | 4/1969 | Blomstrand | |
| 3,469,492 A | 9/1969 | Dahl | |
| 3,476,010 A | 11/1969 | Markey | |
| 3,728,933 A | 4/1973 | Grube | |
| 3,782,061 A | 1/1974 | Minutolie et al. | |
| 3,878,757 A | 4/1975 | Puklus, Jr. | |
| 3,932,957 A | 1/1976 | Morrison et al. | |
| 3,948,141 A | 4/1976 | Shinjo | |
| 4,000,681 A | 1/1977 | Coldren | |
| 4,020,734 A | 5/1977 | Bell | |
| 4,037,516 A | 7/1977 | Hart | |
| 4,047,463 A | 9/1977 | Coldren | |
| 4,055,875 A | 11/1977 | Strickland | |
| 4,149,446 A | 4/1979 | Spengler et al. | |
| 4,286,482 A * | 9/1981 | Marsch et al. | 81/55 |
| 4,407,175 A | 10/1983 | Graham | |
| 4,433,879 A | 2/1984 | Morris | |
| 4,436,003 A | 3/1984 | Cox | |
| 4,479,747 A | 10/1984 | Pagel | |
| 4,592,254 A | 6/1986 | Wallis | |
| 4,604,014 A | 8/1986 | Frano | |
| 4,656,894 A | 4/1987 | Goetz | |
| 4,665,672 A | 5/1987 | Commins et al. | |
| 4,703,711 A | 11/1987 | Haynes | |
| 4,708,555 A | 11/1987 | Terry | |
| 4,720,223 A | 1/1988 | Neights et al. | |
| 4,729,703 A | 3/1988 | Sato | |
| 4,761,860 A | 8/1988 | Krauss | |
| 4,801,231 A | 1/1989 | Everman | |
| 4,812,096 A | 3/1989 | Peterson | |
| 4,875,314 A | 10/1989 | Boilen | |
| 4,887,948 A | 12/1989 | Calmettes | |
| 4,896,985 A | 1/1990 | Commins | |
| 4,909,012 A | 3/1990 | Thompson, Jr. et al. | |
| 4,922,771 A * | 5/1990 | Campbell | 81/484 |
| 4,936,843 A | 6/1990 | Sohngen | |
| 4,954,032 A | 9/1990 | Morales | |
| 4,979,857 A | 12/1990 | Wing | |
| 5,015,132 A | 5/1991 | Turner et al. | |
| 5,081,811 A | 1/1992 | Sasaki | |
| 5,090,855 A * | 2/1992 | Terry | 411/144 |
| 5,115,700 A | 5/1992 | Kaler, 2nd | |
| 5,168,681 A | 12/1992 | Ayrapetyan | |
| 5,180,268 A | 1/1993 | Richardson | |
| 5,197,176 A * | 3/1993 | Reese | 29/278 |
| 5,199,835 A | 4/1993 | Turner | |
| 5,207,543 A * | 5/1993 | Kirma | 411/121 |
| 5,228,250 A | 7/1993 | Kesselman | |
| 5,249,404 A * | 10/1993 | Leek et al. | 52/702 |
| 5,254,016 A | 10/1993 | Ganthier | |
| 5,265,326 A * | 11/1993 | Scribner | 29/758 |
| 5,308,184 A | 5/1994 | Bernard | |
| 5,316,319 A | 5/1994 | Suggs | |
| 5,340,258 A | 8/1994 | Simon | |
| 5,364,214 A | 11/1994 | Fazekas | |
| 5,365,715 A | 11/1994 | Steinmetz et al. | |
| 5,370,483 A | 12/1994 | Hood et al. | |
| 5,379,563 A | 1/1995 | Tinsley | |
| 5,386,748 A * | 2/1995 | Kilgore | 81/180.1 |
| 5,487,632 A | 1/1996 | Hood et al. | |
| 5,505,026 A | 4/1996 | Fausto | |
| 5,522,688 A | 6/1996 | Reh | |
| 5,535,561 A | 7/1996 | Schuyler | |
| 5,540,530 A | 7/1996 | Fazekas | |
| 5,570,549 A | 11/1996 | Lung et al. | |
| 5,582,496 A | 12/1996 | Ambrico et al. | |
| 5,606,839 A | 3/1997 | Baumann | |
| 5,704,572 A | 1/1998 | Vogel et al. | |
| 5,769,581 A | 6/1998 | Wallace et al. | |
| 5,815,999 A | 10/1998 | Williams | |
| 5,829,531 A | 11/1998 | Hebert et al. | |
| 5,839,321 A | 11/1998 | Siemons | |
| 5,885,034 A | 3/1999 | Fergusson | |
| 5,931,618 A | 8/1999 | Wallace et al. | |
| 5,979,130 A * | 11/1999 | Gregg et al. | 52/295 |
| 5,987,828 A | 11/1999 | Hardy | |
| 6,019,556 A | 2/2000 | Hess | |
| 6,068,250 A | 5/2000 | Hawkins et al. | |
| 6,120,723 A | 9/2000 | Butler | |
| 6,135,687 A | 10/2000 | Leek et al. | |
| 6,139,113 A | 10/2000 | Seliga | |
| 6,158,188 A * | 12/2000 | Shahnazarian | 52/702 |
| 6,161,350 A | 12/2000 | Espinosa | |
| 6,167,785 B1 * | 1/2001 | Penner | 81/121.1 |
| 6,250,041 B1 * | 6/2001 | Seccombe | 52/712 |
| 6,256,960 B1 | 7/2001 | Babcock et al. | |
| 6,282,994 B1 * | 9/2001 | Wei | 81/121.1 |
| 6,327,831 B1 * | 12/2001 | Leek | 52/698 |
| 6,390,747 B1 | 5/2002 | Commins | |
| 6,494,654 B2 | 12/2002 | Espinosa | |
| 6,513,290 B2 * | 2/2003 | Leek | 52/295 |
| 6,585,469 B2 | 7/2003 | Commins | |
| 6,688,058 B2 | 2/2004 | Espinosa | |
| 6,745,649 B1 * | 6/2004 | Liao | 81/121.1 |
| 2001/0002524 A1 | 6/2001 | Espinosa | |
| 2001/0002529 A1 | 6/2001 | Commins et al. | |
| 2001/0037611 A1 | 11/2001 | Cornett, Sr. | |
| 2002/0020137 A1 | 2/2002 | Commins | |
| 2002/0066246 A1 | 6/2002 | Leek | |
| 2002/0092383 A1 * | 7/2002 | Nezigane | 81/121.1 |
| 2006/0000318 A1 * | 1/2006 | Hsieh | 81/121.1 |
| 2006/0037265 A1 * | 2/2006 | Leek | 52/295 |
| 2006/0053714 A1 * | 3/2006 | Pryor et al. | 52/292 |

FOREIGN PATENT DOCUMENTS

| | | |
|---|---|---|
| GB | 383460 | 11/1932 |
| GB | 1099472 | 1/1968 |
| GB | 1384511 | 2/1975 |
| JP | 46-1521 | 1/1971 |
| SU | 706586 | 12/1979 |
| SU | 796498 | 1/1981 |

OTHER PUBLICATIONS

Greenwood, Douglas C. ed. *Product Engineering Design Manual*, McGraw-Hill Book Company, Inc., (New York), copyright 1959, (pp. 90-97, 316-329).

Richardson, Arthur B. Declaration of Arthur B. Richardson, executed Dec. 21, 2002 at Mill Valley, California.

"Expansion Jack Washer," Anchor Tiedown System, Inc. Brochure (Mill Valley, CA and Burien , WA) (1999).

"Device Keeps Shear Walls Tight," Received in the Offices of James R. Cypher May 18, 2000. Source Unknown. p. 49-50.

"Thru-Bolt Log Fastening System," Heritage Log Homes, Inc. (1999). Downloaded from the Internet.

"Earthbound Seismic Holdown System Using The 'Impasse Device'," Evaluation Report No. ER-5378, Nov. 1, 1997. ICBO Evaluation Service, Inc. Whittier, Calif., pp. 1-6.

Inquest Engineering. Manufacturers of the Earthbound System. Redefining the State of the Art in Seismic Holdown Technology. Inquest Engineering. Woodinville, WA. Date Unknown.

"The Impasse Devise," Inquest Engineering LLC. Woodinville WA. Retrieved from the Internet Jan. 22, 1998.

"LocTite, Automatic Self-Locking Nuts. Maintenance Free Through-Bolt Log Home Construction." K.F.C., U.S.A. LocTite Division. Kennesaw, GA Received in the Offices of James R. Cypher Jan. 1992.

"Zone Four. Engineered Seismic Solutions. Products-Auto Take-Up.," Zone Four LLC. San Leandro, CA. pp. 1-4, (2000) Downloaded from the Internet.

"AT Auto Take-Up™. Shearwall Shrinkage Compensator Solves the Loose Shearwall Problem," Zone Four. San Leandro, CA and Commins Manufacturing, Inc. Friday Harbor, WA, (2001).

"ATS-Components," Simpson Strong-Tie Company, Inc., Dublin, CA. Date Unknown. Downloaded from the Internet.

"ATS Anchor Tiedown Systems. Concentric Holdown for Multi-Story Commercial Applications—3, 4 and 5 Story Applications." Catalog C-2002, p. 19. Simpson Strong-Tie Co., Inc. 2002.

"Acceptance Criteria for Shrinkage Compensating Devices and Similiar Devices," Proposed ICBO Take-UP Devices Acceptance Criteria, Draft 1, Dec. 9, 1999, Commins Design LLC (Friday Harbor, WA), 3 pages, (Nov. 2, 1999 and Dec. 9, 1999).

"Evaluation Report, ER-XXXX," Proposed report regarding Commins Design AT Automatic Take-UP Shrinkage Compensating Devices, ICBO Evaluation Service Inc. Whittier, CA. 5 pages. Dec. 10, 1999.

"AT Auto Take-UP™, Shearwall Shrinkage Compensator Solves the Loose Shearwall Problem." Commins Design LLC. Friday Harbor, WA. 1 page. Jan. 3, 2000.

"Commins Design LLC, Our Solution to Wood Shrinkage Solves Shearwall Problems." Tech Note #1. Jan. 2000. Commins Design LLC, Friday Harbor, WA, 2 pages.

Automatic Take-Up Device by Alfred D. Commins, dated Feb. 10, 1997. Simpson Strong-Tie Company, Inc. (5 pages).

Automatic Take-Up Device by Alfred D. Commins, dated Aug. 15, 1996. Simpson Strong-Tie Company, Inc. (7 pages).

Automatic Take-Up Device by Alfred D. Commins, dated Mar. 6, 1996. Simpson Strong-Tie Company, Inc. (3 pages).

Automatic Take-Up Device by Alfred D. Commins, dated Mar. 6, 1996 and Jan. 25, 1996. Simpson Strong-Tie Company, Inc. (5 pages).

Automatic Take-Up Device by Alfred D. Commins, dated Dec. 26, 1995. Simpson Strong-Tie Company, Inc. (3 pages).

* cited by examiner

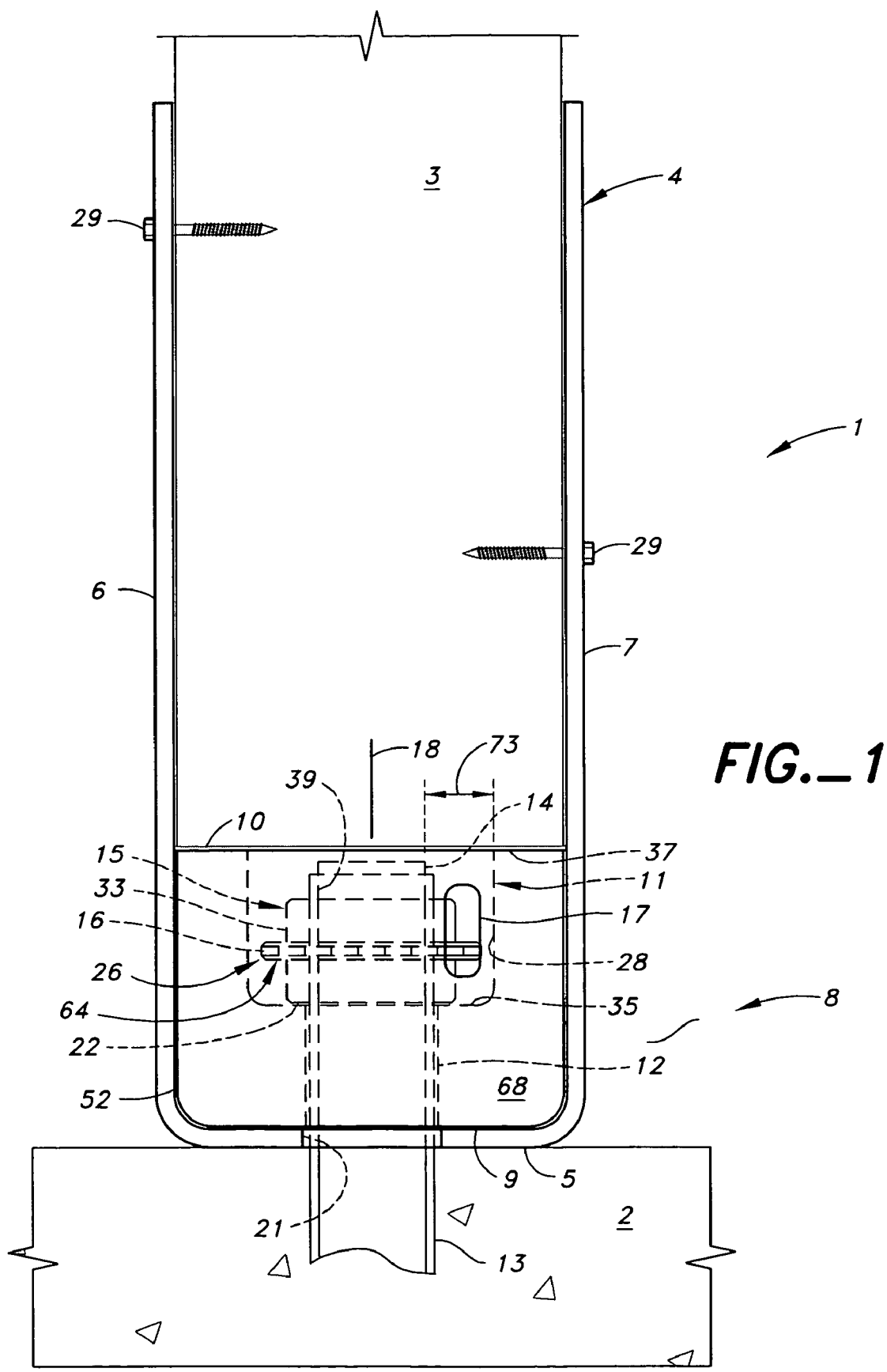
FIG._1

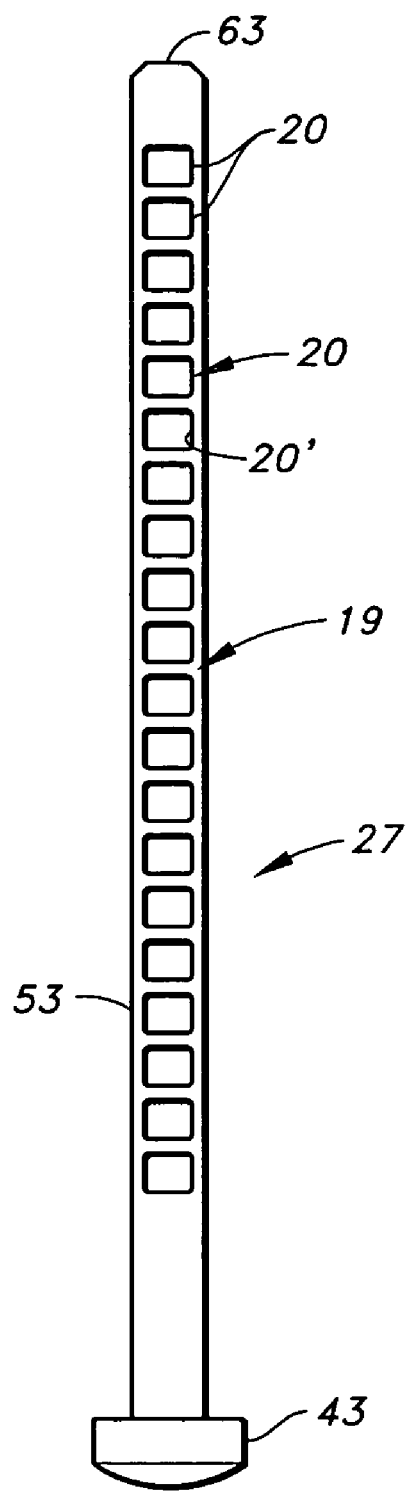
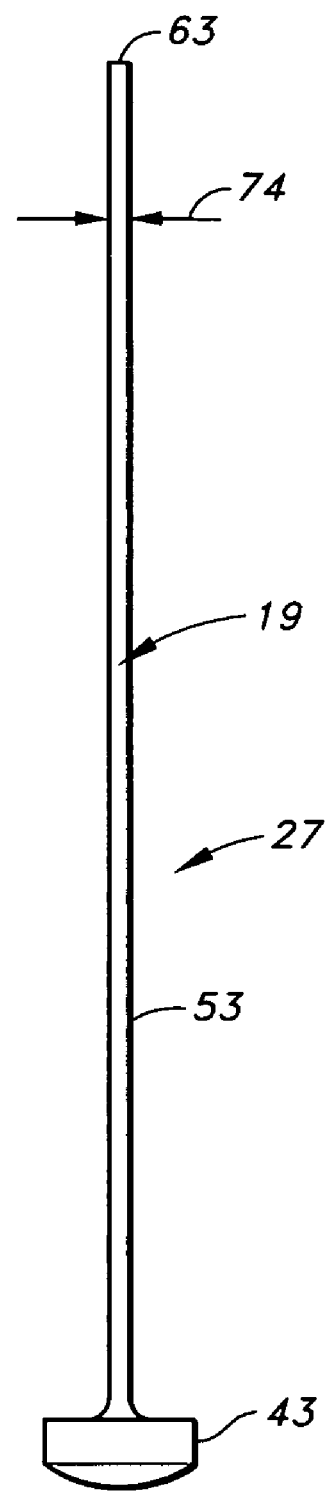
FIG._2   FIG._3

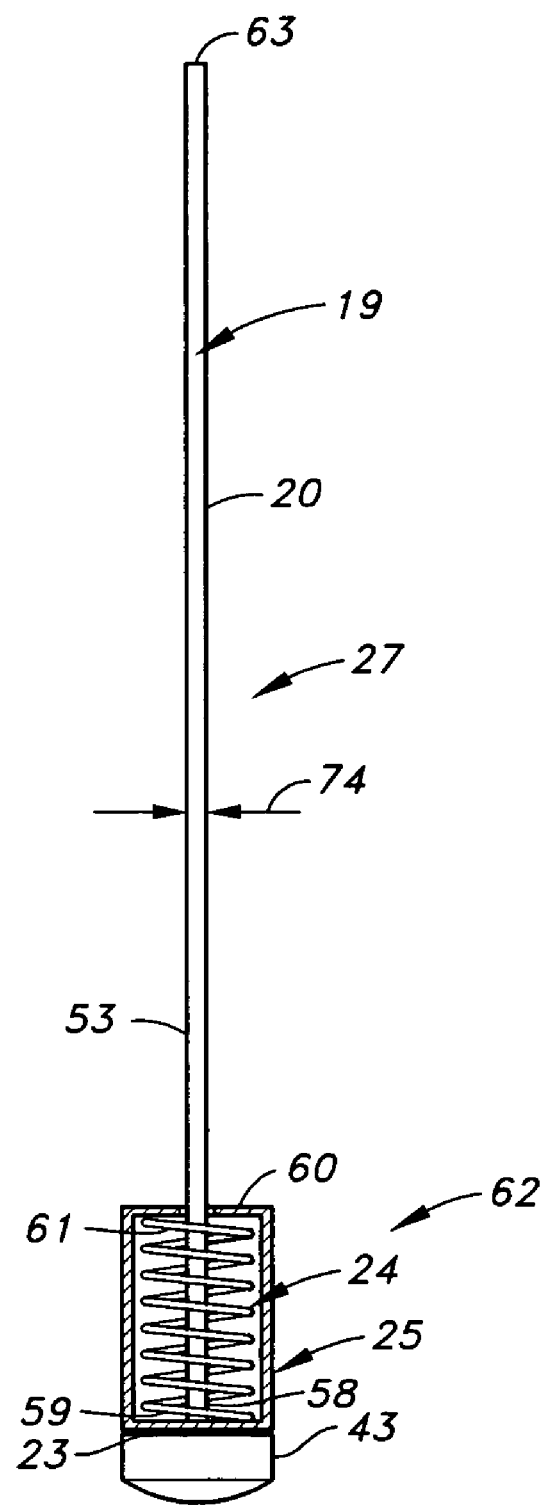
FIG._4

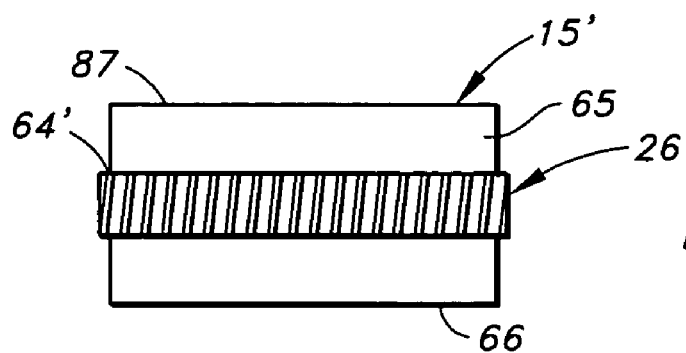
FIG._5A
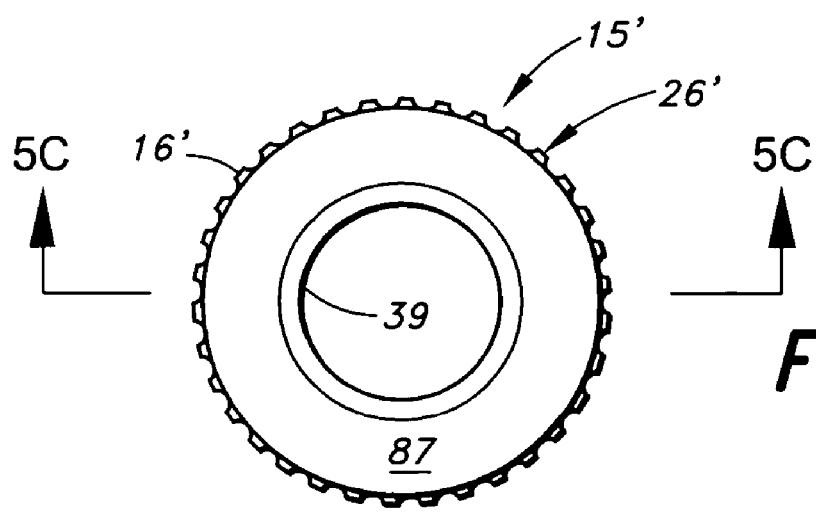
FIG._5B
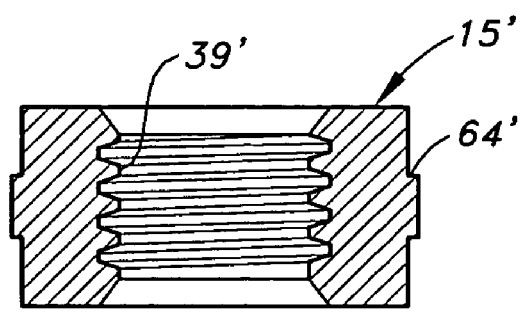
FIG._5C

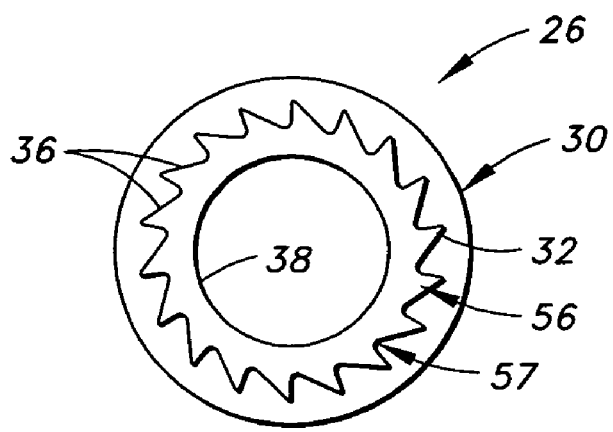
FIG._6A
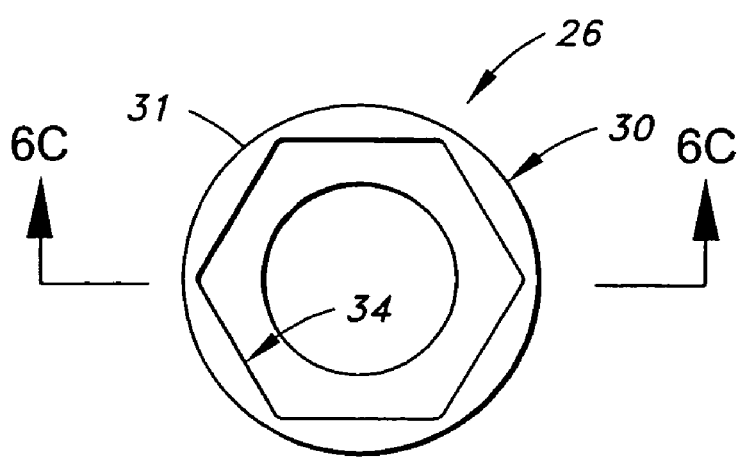
FIG._6B
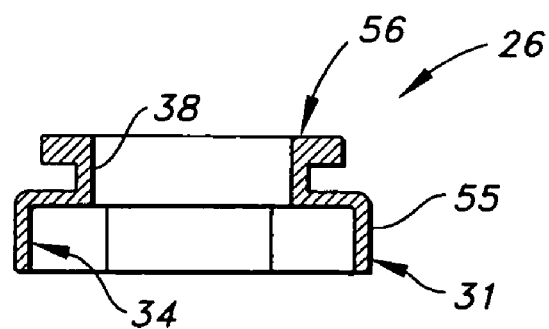
FIG._6C

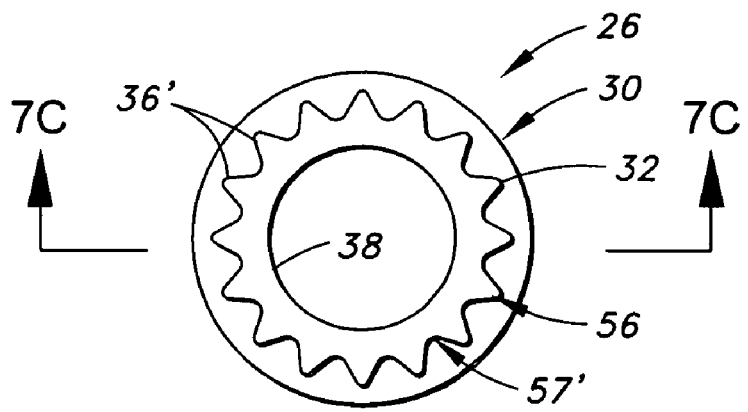
FIG._7A
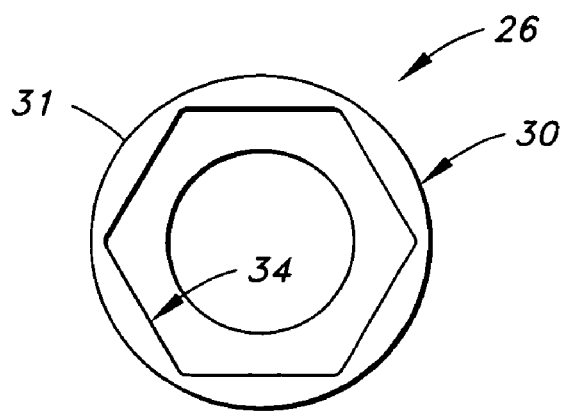
FIG._7B
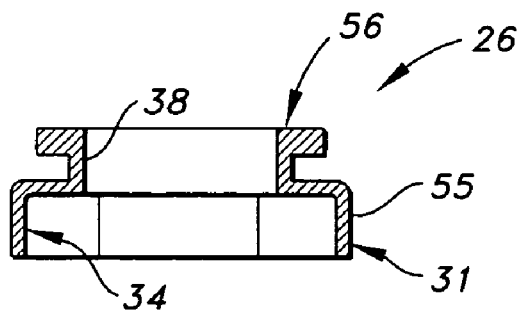
FIG._7C

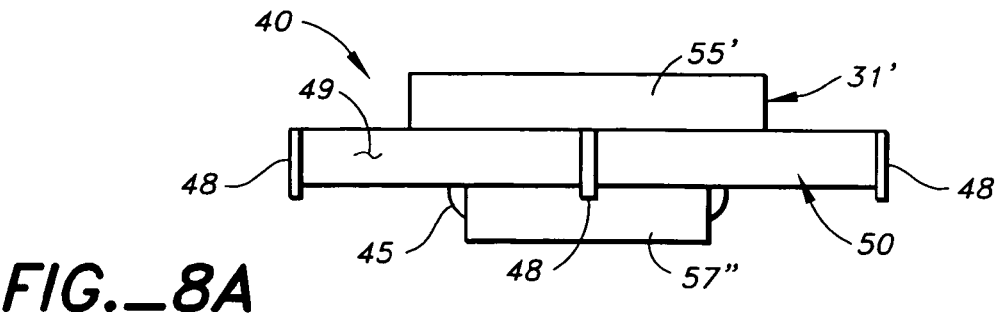
FIG._8A
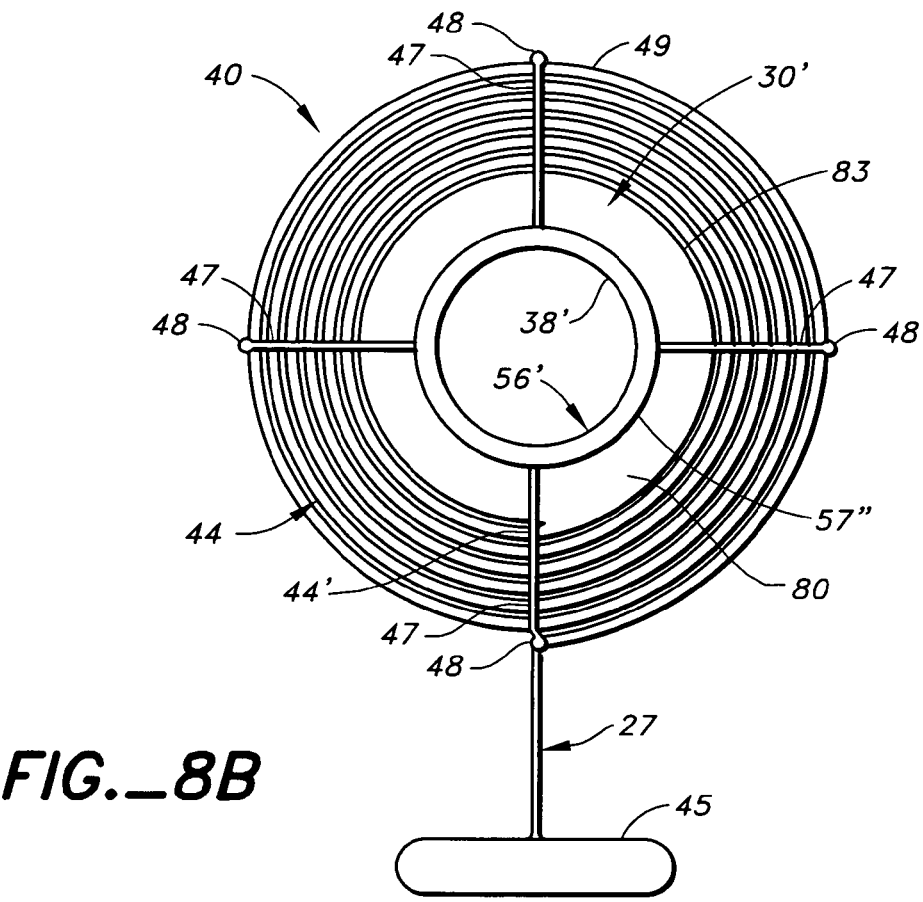
FIG._8B
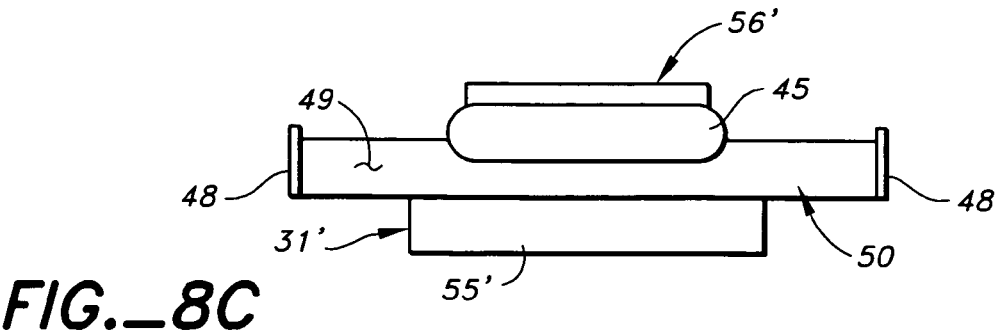
FIG._8C

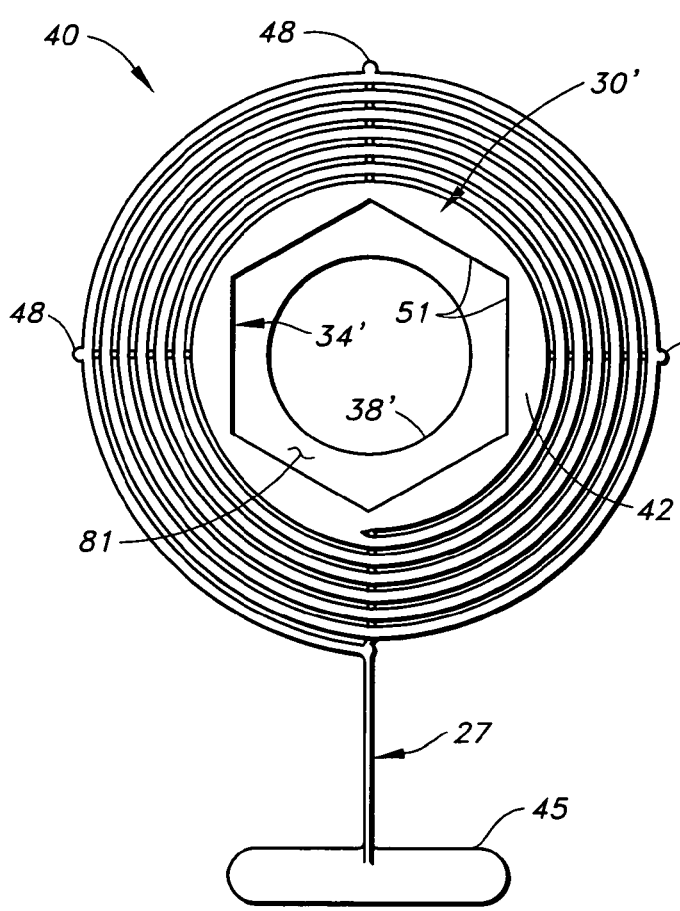 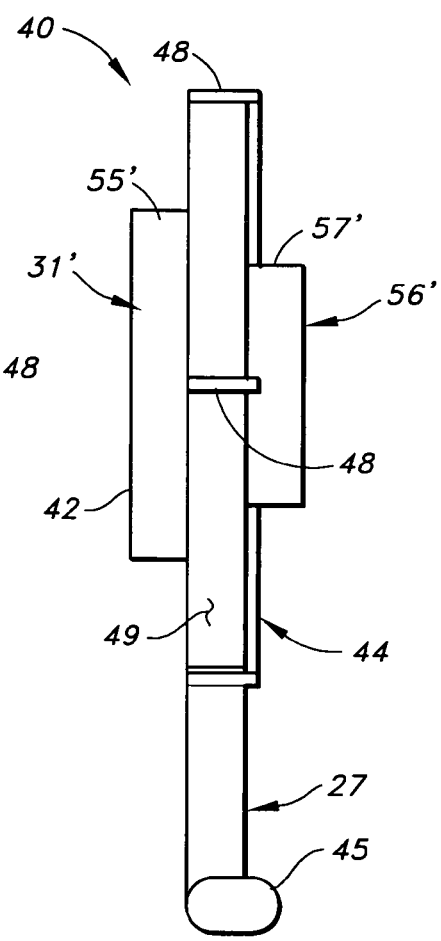
FIG._8D　　　　FIG._8E

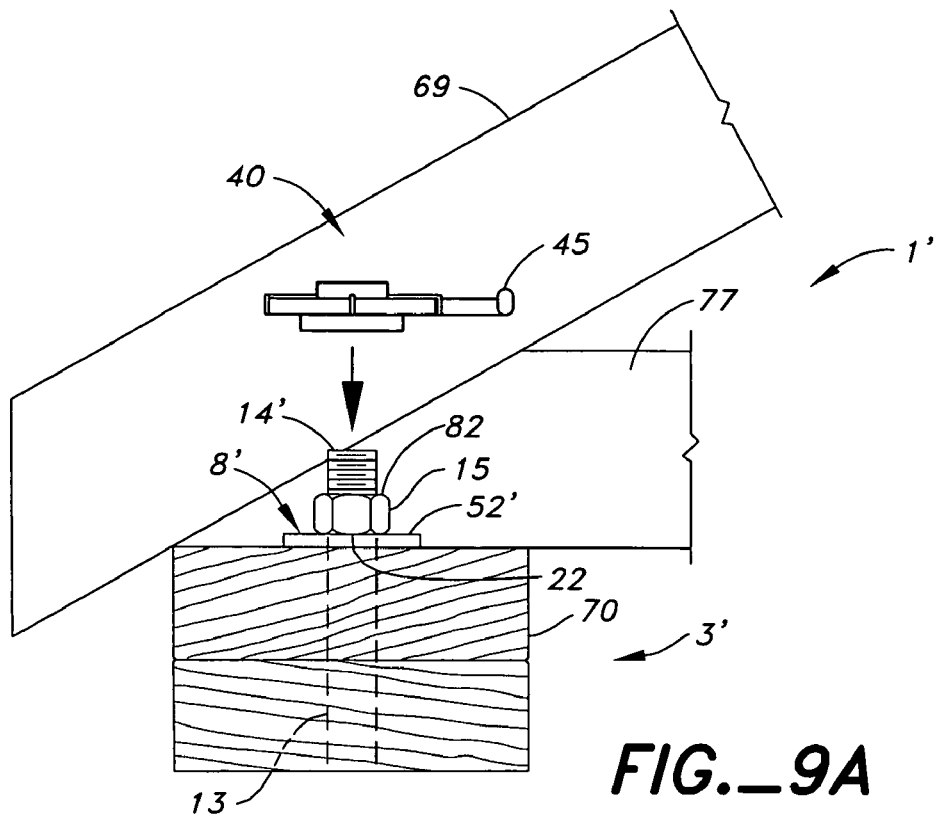
FIG._9A
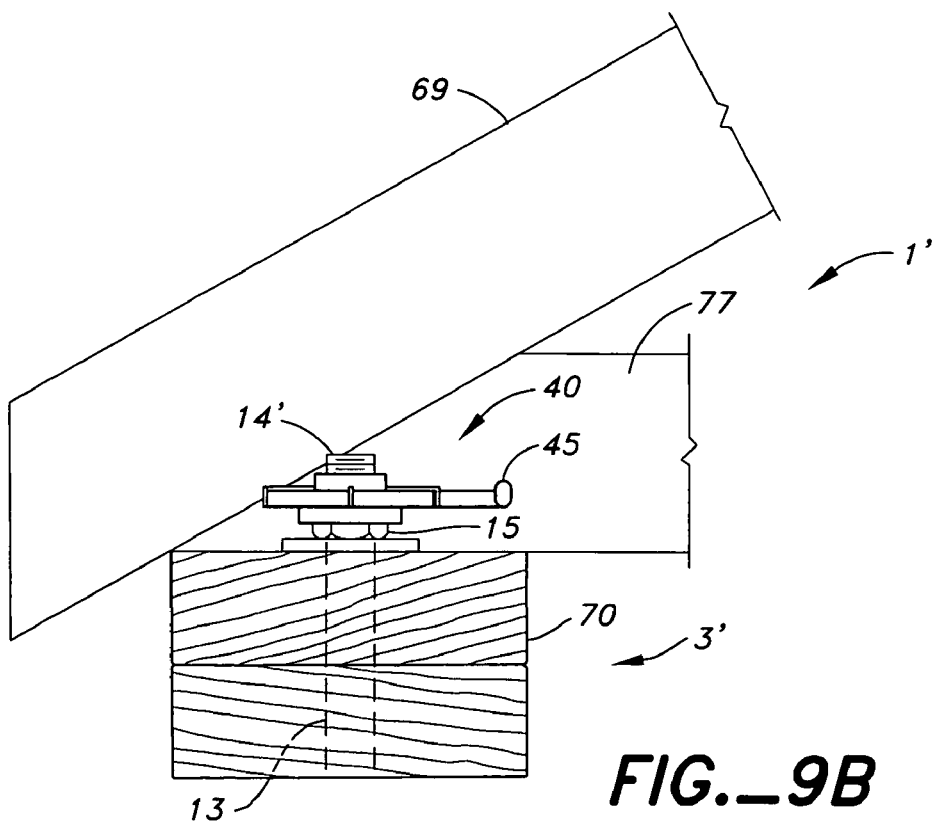
FIG._9B

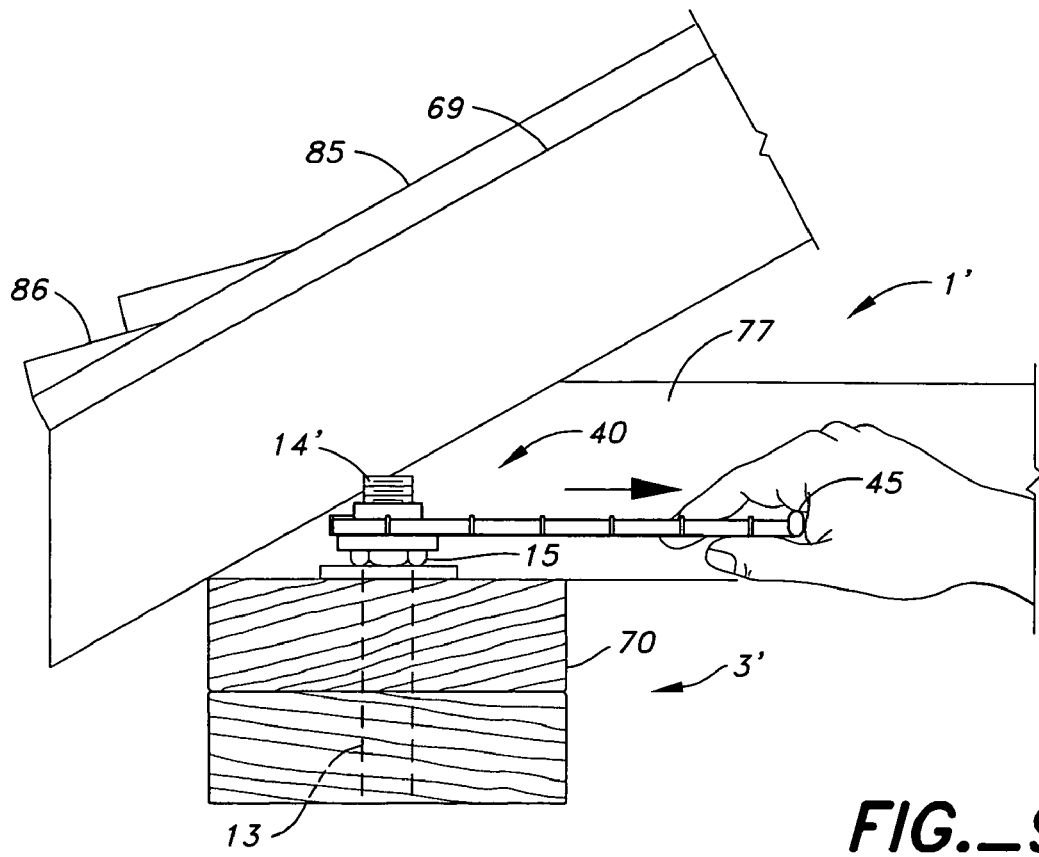
FIG._9C
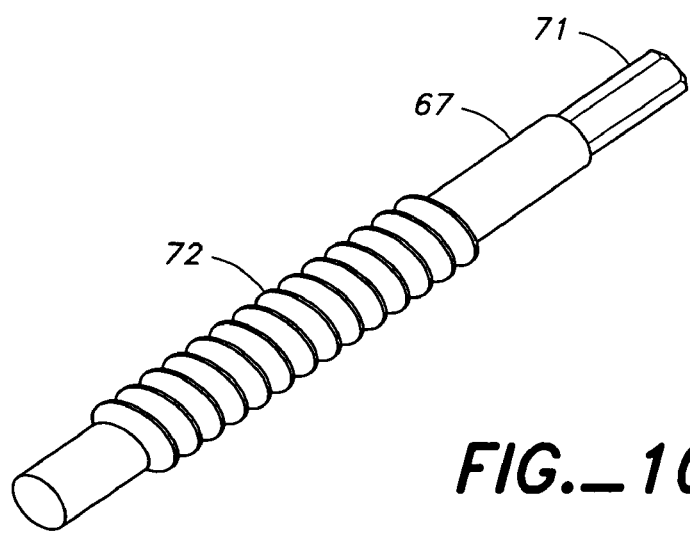
FIG._10

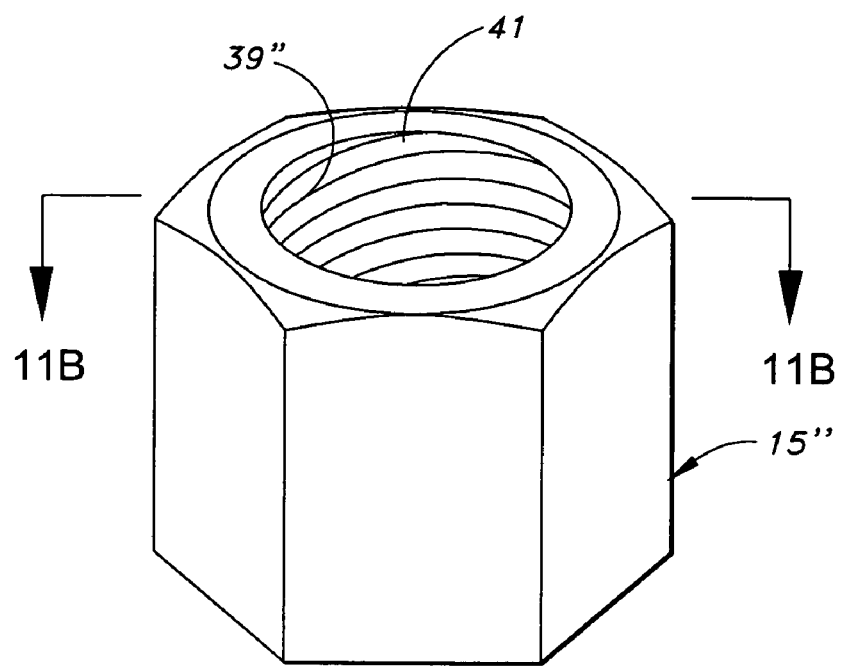
FIG._11A
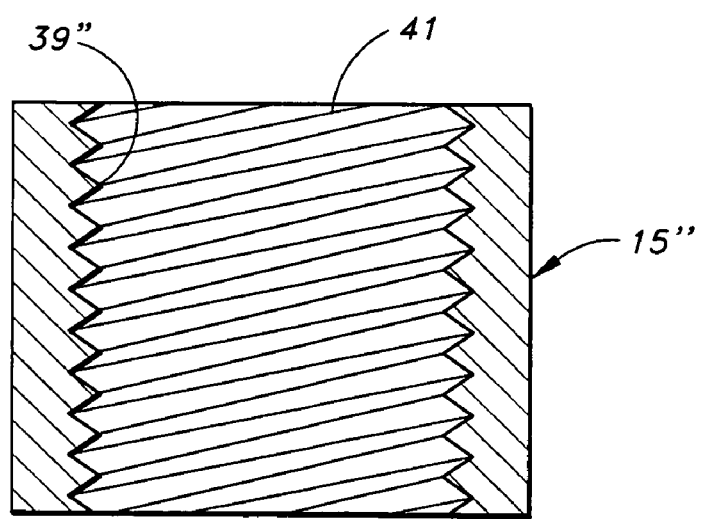
FIG._11B

LIMITED ACCESS BUILDING CONNECTION

BACKGROUND OF THE INVENTION

This invention relates to those connections in building structures in which wood or steel frame held embedded structures are connected to a holding structure such as a concrete foundation by means of a threaded end steel anchor bolt or rod or another steel or wood structure. In these connections, a nut is threadably attached to the distal end of the anchor bolt or rod. The nut engages a washer or holdown which in turn is connected to a wood or steel building structural frame member.

More specifically, the invention relates to building connections in which there is a dimensional restriction which limits the access of standard tools to install and maintain a specified torque force on the threaded nut. The outer face of the nut may be too close to either the holdown member or the side wall of the structure being held. There also may be insufficient space above the end of the threaded anchor member for a standard tool to gain access to the nut.

Access to threaded nuts which are difficult to access and turn due to dimensional restrictions have spawned a host of special tools to rotate the nuts. Special tools of varying complexity have been devised to tighten nuts in dimensionally restricted applications, but most are inadequate to cope with situations where there is an extreme restriction of less than about a ⅟₁₆th inch gap between the side wall of the nut and adjacent connection walls or the walls of the structure being held.

Tools capable of operating in such extreme restriction conditions are either too fragile to successfully operate in the building connections of the present invention, or they are incapable of meeting the torque requirements of threaded connections in the present building connections.

SUMMARY OF THE INVENTION

The present invention solves the problem of how to meet the torque requirements and to install a threaded nut in extreme dimensionally restricted conditions.

An object of the present invention is to provide a connection between a holding and a held structure which maximizes the bearing surface area for the held structure while enabling threading and tightening of a nut on a threaded anchor bolt without the need for expensive tools.

Another object of the present invention is to disclose a new disposable tool for tightening the threaded nuts.

A further object is to provide a system for using the new disposable tool for automatically tightening the nut on the threaded anchor during the life of the connection as wood shrinkage in the structure being held occurs.

Still another object is to provide a combination nut which both engages the threaded anchor member and serves as a washer in engaging a holdown member. The combination nut is formed with an annular ring of driven members for engaging the new disposable tool of the present invention.

A still further object is to provide a cap member which can be used to engage and turn a standard hex nut using the new disposable tool of the present invention.

Another object is to provide a cap member which is formed with ratchet teeth, sprocket teeth, or gear teeth so that the threaded nut can be turned in only one direction or in both directions by the new disposable tool of the present invention Another object of the present invention is to provide an alternate disposable tool for engaging and tightening a standard threaded hex nut wherein access to the nut is dimensionally limited from above the nut.

Still another object of the present invention is to provide a system in which the nut can be rotated by means of a power drill using a worm gear bit.

A still further object is to use a multistart nut in the limited access building connection of the present invention wherein maximum linear movement is attained with a minimum amount of rotation of the multistart threaded nut.

The system used in the present invention is not only inexpensive to install the initial connection, but it is equally inexpensive to maintain the integrity of the connection as wood shrinkage degrades the connection.

The system of the present invention can be inexpensively upgraded to an automatic take up device which continuously maintains the integrity of the connection without periodic skilled labor intervention during the many years the connection is in service.

BRIEF DESCRIPTION OF THE FIGURES

FIG. 1 is a side view of a connection of the present invention with portions of the internal portions of the connection shown in broken line to illustrate the operation of the invention FIG. 2 is a front view of one form of a portion of the present building connection showing a form of tool used in constructing and maintaining the present building connection.

FIG. 3 is a side view of the portion of the present invention illustrated in FIG. 2.

FIG. 4 is a side view of another form of the invention illustrated in FIG. 2 encompassing an automatic take up device.

FIG. 5A is a side view of an alternate form of nut which may be used in the present invention.

FIG. 5B is a top plan view of the nut illustrated in FIG. 5A.

FIG. 5C is a sectional view of the nut taken along line 5C—5C of FIG. 5B.

FIG. 6A is a top plan view of a cap member used in a form of the invention used to transfer rotational energy to a standard nut.

FIG. 6B is a bottom plan view of the cap member of FIG. 6A.

FIG. 6C is a sectional view of the cap member taken along line 6C—6C of FIG. 6B.

FIG. 7A is a top plan view of another form of the invention illustrated in FIGS. 6A, 6B and 6C showing the side and bottom of the form of the invention.

FIG. 7B is a bottom plan view of the invention illustrated in FIG. 7A.

FIG. 7C is a sectional view taken along line 7C—7C in FIG. 7A.

FIG. 8A is an inverted front elevation view of still another form of the invention.

FIG. 8B is a top plan view of the invention illustrated in FIG. 8A.

FIG. 8C is a back elevation view of the invention illustrated in FIG. 8B.

FIG. 8D is a bottom plan view of the invention illustrated in FIG. 8B.

FIG. 8E is a side elevation view of the invention illustrated in FIG. 8D.

FIG. 9A is an exploded side elevation view of a portion of a building structure and another form of the limited access building connection of the present invention showing a spiral hand pull device 40 ready for positioning on nut 15.

FIG. 9B is the same view as FIG. 9A with spiral hand pull device 40 mounted on nut 15.

FIG. 9C is the same view as FIGS. 9A and 9B with spiral hand pull device actuated.

FIG. 10 is a perspective view of a worm gear bit which may be used in the connection of the present invention.

FIG. 11A is a perspective view of a multistart nut of the present invention.

FIG. 11B is a sectional view of a multistart nut taken along line 11B—11B of FIG. 11A.

DETAILED DESCRIPTION OF THE INVENTION

FIG. 1 of the drawings illustrates one form of a limited access building connection 1 of the present invention for connecting a holding structure 2 and a held structure 3 and consists briefly of an anchor member 13 adapted for connection to holding structure 2 and having a threaded end 14; a nut 15 having an inner threaded wall 39 for threadably engaging threaded end 14 of anchor member 13 and having a base 22; connector means 8 adapted for engaging base 22 of nut 15 and adapted for connection to held structure 3; nut rotational means 26 for imparting rotational motion to nut 15; dimensional limited access parameters existent between nut 15 and connector means 8 and held structure 3; and linear power means 27 dimensioned and configured to work within dimensional limited access parameters and adapted for engaging and imparting rotational energy to nut rotational means 26.

Still referring to FIG. 1, a limited access building connection 1 of the present invention may include a nut rotational means 26 which includes a ring 64 of externally formed rotational driven members 16 adapted for connection on the perimeter of nut 15; and linear power means 27 includes a plurality of driving means 20 for engaging rotational driven members 16 for imparting rotational motion to nut 15.

Referring to FIG. 1, rotational driven members 16 may be ratchet teeth for one way rotation of nut 15.

Still another way to construct nut rotational means 26 with rotational driven members which are gear teeth for two way rotation of the nut 15.

Still another way to construct nut rotational means 26 is to form rotational driven members 16 as sprocket teeth for two way rotation of nut 15.

Referring to FIGS. 5A, 5B and 5C, another form of a limited access building connection 1 is illustrated. In this form nut 15' is formed as a disc having an annular circumferential wall 65 and a base 66 having a substantial planar portion adapted for engaging connector means 8; nut rotational means 26 includes a ring 64' of externally formed driven members 16' mounted on annular circumferential wall 65; and linear power means 27 includes a plurality of driving means 20 for engaging rotational driven members 16' for imparting rotational motion to nut 15'. Inner threaded wall 39' threadably engages threaded anchor member 13.

Another way of constructing nut rotational means 26 as illustrated in FIGS. 6A, 6B and 6C is to form rotational driven members 16' as ratchet teeth.

Still another way of constructing nut rotational means 26 is to form rotational driven members 16' as gear teeth.

A further way of constructing nut rotational means 26 as illustrated in FIGS. 7A, 7B and 7C is to form rotational driven members 16' as sprocket teeth.

Referring to FIGS. 2 and 3, linear power means 27 is constructed as an elongated pull member 19 having a generally straight portion 53 formed from plastic.

Still referring to FIGS. 2 and 3, driving means 20 are a plurality of openings 20' formed in plastic elongated pull member 19.

As best illustrated in FIG. 1, the limited access building connection 1 of the present invention includes a nut 15 which is laterally distant from held structure 3 a distance only slightly greater than the width of linear power means 27.

Still referring to FIG. 1, connector means 8 of limited access building connection 1 includes a washer member 52 formed with a recess 11 having a recess wall 28; and the distance 73 between the outermost lateral dimension of threaded end 14 of anchor member 13 and recess wall 28 of washer member 52 less the distance from the outermost lateral dimension of threaded end 14 to the outermost dimension of rotational driver member 16 is a distance only slightly greater than the width 74 of linear power means 27.

Referring to FIG. 1, limited access building connection 1 includes washer member 52 which is formed with a narrow lateral tunnel 17 therethrough permitting engagement of linear power means 27 with nut rotational means 26.

Referring again to FIG. 1, limited access building connection 1 further includes washer member 52 which is formed with a bore 12 for receiving anchor member 13 therethrough and includes a support surface 10 and a base 9. Connector means 8 includes a concentric connector member 4 formed with a seat member 5 integrally connected to upright strap members 6 and 7 and is formed with an opening 21 in seat member 5 for receiving anchor member 13 therethrough. Washer member 52 is formed with a support surface 10 and is positioned to register with seat member 5 of concentric connector member 4 and held structure 3 is supported on support surface 10 and is connected to upright strap members 6 and 7.

Limited access building connection 1 may be further defined as including a nut rotational means 26 illustrated in FIGS. 6A, 6B, 6C, 7A, 7B and 7C which includes a cap member 30 formed for coaxial movement along the axis 18 of anchor member 13 and formed with a base section 31 having an annular outer wall 55 and having an inner wall 34 configured and dimensioned to inter fit with outer wall 33 of internally threaded nut 15 and a head section 56 having an integrally formed inner ring wall 38 and an integrally formed outer ring wall 57 having externally formed cap rotational driven members 32 formed to engage and to be rotationally driven by driving means 20 of linear power means 27.

Referring specifically to FIG. 6A, rotational driven members 32 may take several forms. One form is to form driven members 32 as ratchet teeth 36. Ratchet teeth 36 are preferable used where only one way rotational direction of the nut 15 is specified.

Referring specifically to FIGS. 7A, 7B and 7C, rotational driven members 32 may also be formed as sprocket teeth 36' in integrally formed outer ring wall 57'. Sprocket teeth 36' are desirable where specifications call for the rotation of nut 15 in both directions. In some connections where it is desirable to remove the connection 1, the use of sprocket teeth 36' is desirable.

Referring to FIGS. 8A through 8E, limited access building connection 1 is constructed, wherein, nut rotational means 26 and linear power means 27 are combined in an integral spiral hand pull device 40 which includes: a modified cap member 30' formed with ring wall 38' forming an opening therethrough for coaxial movement along axis 18 of anchor member 13 and formed with a base section 31' having an annular outer wall 55' having a lower face 42 and having a plurality of segments 51 forming a hexagonal inner wall 34' configured and dimensioned to inter fit with outer wall 33 of internally threaded nut 15 and a head section 56' having an integrally formed inner ring wall 38' and an integrally formed outer ring wall 57". Spiral hand pull device 40 further includes a spirally wound flexible elongated member 44 attached to integrally formed outer ring wall 57" and to a handle 45.

As best shown in FIG. 8B, spiral pull device 40 includes: at least one spoke 47 releasably attached to spirally wound flexible elongated member 44 and to integrally formed outer ring wall 57" and holding spirally wound flexible elongated member 44 in an initially flat plane.

Spiral hand pull device 40 is preferably formed with at least one spoke finger 48 releasably attached to face wall 49 of the outermost spiral 50 of spirally wound flexible elongated member 44 and to at least one spoke 47.

In a limited access connection, as illustrated in FIG. 1, it is very desirable to have a means of automatically tightening the nut as the wood in the connection shrinks.

FIG. 4 illustrates a portion of a limited access building connection 1 as defined in the present invention which includes an automatic take up means 62 adapted for connection to linear power means 27 exteriorally from nut rotational means 26.

Limited access building connection 1 as illustrated in FIG. 4 is further defined by an automatic take up means 62 which includes a housing 25 for retaining compression spring 24 and an abutment end 60 operatively bearing against limited access building connection 1; linear power means 27 is an elongated pull member 19 having a distal end 63 and having a bearing stop member 23 formed on the proximal end 58 of elongated pull member 19; and compression spring 24 has a proximal end 61 engaging housing 25 and a distal end 59 in thrust engagement with bearing stop member 23 on elongated pull member 19.

Referring to FIGS. 9A, 9B and 9C, another form of limited access building connection 1' is illustrated in which anchor member 13 embedded in a holding structure such as a foundation (not shown) is formed with an end 14'. Held structure 3, such as a rafter 69 and ceiling joist 77 connected to double top plate 70, may be axially distant from end 14' a negligible distance only. In such event, integral spiral hand pull device 40 must be installed prior to installing sheathing boards 85 and shingles 86 as illustrated in FIG. 9C.

In FIGS. 9A, 9B and 9C, base 22 of nut 15 bears against connector means 8' which may be a flat washer 52' which bears against the upper face of double top plate 70.

The derivation of the foregoing species of the present invention illustrated in FIGS. 9A, 9B and 9C occurred during a quest for a solution to a building construction problem which occurs frequently in hurricane prone states such as Florida and South Carolina. In these states and other coastal states and off shore islands, the roofs of many residential buildings have a roof pitch which is so small that it is impossible for a workman to tighten nuts 15 on connectors between the roof rafters 69 and the top plate 70 after the roof has been installed.

As shown in FIG. 9C, a workman would ordinarily tighten nut 15 on threaded anchor member 13 with a standard socket wrench or crescent wrench before the roofers installed the roof sheathing boards 85 on rafters 69 and roof shingles 86 or other roofing material.

After the roof has been installed and after the wood framing members such as wall posts or studs and double plates 70 have gone through their time period for normal shrinkage, nut 15 will ordinarily become loose. In order for the limited access connection to retain its full holding strength, nut 15 must be tightened.

After the roof has been installed, there is no longer sufficient access for a workman to reach and tighten nut 15 as illustrated in FIG. 9C with a standard wrench. Applicant Leek found that the only way to tighten nut 15 at the time wood shrinkage occurred was to install integral spiral hand pull device 40 illustrated in FIGS. 8A–8E on the upper annular face 86 of nut 15 before the roof sheathing 85 was installed. Integral spiral hand pull device 40 must be placed over nut 15 so that the inner wall 34' of pull device 40 is in registration with the sides of nut 15 and handle 45 is located so that a workman may crawl out toward the outer wall; reach out his arm and grasp handle 45 with his hand and pull towards himself. Only a turn or two or even a fraction of a turn at times is sufficient to tighten the nut 15 to bring the connection 1' up to its initial design holding capacity.

Referring to FIG. 10, still another form of the limited access building connection 1 is illustrated wherein linear power means 27 is a worm gear bit 67 formed with a bit end 71 for engagement with a power drill and dimensioned and configured with worm gear threads 72 to engage with worm gear threads on a rotational means 26 such as nut 15' illustrated in FIG. 5A for imparting rotational motion to nut 15'.

Worm gear bit 67 is dimensioned to be received in narrow lateral tunnel 17 shown in FIG. 1.

FIGS. 11A and 11B illustrate another form of nut 15" in which the threads are formed with four starts. The use of multistart threading of the nut 15" is particularly advantageous in the present invention because of the need to obtain as much vertical movement of the nut 15" for the limits placed on the number of turns that can be achieved with elongated pull member 19 illustrated in FIGS. 2 and 3. Multistart threading of nuts is well known in the art and the use of standard well known multistart nuts may be used in the present invention. The use and principles of multistart nuts is so common that most every peanut jar has a multistart lid for quick removal and replacement of the threaded lid. In like manner a short pull on elongated pull member 19 will suffice to fully install nut 15".

As shown in FIG. 11 of the drawings, inner threaded wall 39" of nut 15" is formed with preferably four multistart threads 41 for rapid tightening of nut on 15" on anchor member 13 with a limited number of rotations of nut 15".

Operation of the Invention

FIG. 1 illustrates a preferred form of the invention, but it should be understood that this is but one of many possible forms of the invention. Washer member 52 is only one of many different washer forms. Washer member 52, e.g. could be formed with a slot therethrough as wide as the bore diameter of recess 11 and no tunnel 17 would then be required. Also, if the held structural member 3 were held by fasteners 29, less, or in some cases no support at surface 10 of washer member 52 would be required.

Turning to the operation of limited access connection 1, as illustrated in FIG. 1, concentric connector 4 is lowered onto anchor member 13 through opening 21 in seat member 5 until seat member 5 rests on holding structure 2 which in this case is a concrete foundation. Washer member 52 is then lowered over anchor member 13 through bore 12 formed in washer member 52 until base 9 rests on seat member 5. Nut 15 is then threaded onto threaded end portion 14 of anchor member 13 and rotated until base 22 of nut 15 bears against base 35 of recess 11. Held structure 3 which may be a post 3, is then lowered between strap members 6 and 7 until the base 37 of held structure 3 rests on support surface 10 of washer member 52. Post 3 is then firmly attached to strap members 6 and 7 by fasteners 29. After any adjustment that need to be made in aligning post 3 with anchor member 13 are made, Nut 15 is then ready for tightening onto threaded end 14 of anchor member 13.

Nut 15 is tightened against base 35 of recess 11 by selecting either elongated pull member 19 illustrated in FIGS. 2 and 3, or automatic take up means 62 illustrated in FIG. 4. Using the elongated pull member 19, e.g., the distal end 63 of elongated pull member 19 is inserted through narrow lateral tunnel 17. As may be understood by viewing FIG. 1, the elongated pull member 19 must be flexible, in most cases, to be able to be inserted past the rotational driven members 16 on annular ring 64 surrounding nut 15. When elongated pull member 19 has been fully inserted into narrow lateral tunnel 17, it is pulled back slightly until one or more openings 20' forming driving means 20 engage rotational driven members 16. Grasping head 43, elongated pull member 19 is then pulled until nut 15 is firmly tightened on threaded anchor member 13. If necessary, the process may be repeated as just described if it takes more than one pull on elongated member 19 to properly tighten the nut 15 on anchor member 13.

If automatic take up means 62 is specified, the process is basically the same. When nut 15 is tight on anchor member 13, elongated pull member 19 is fully inserted into narrow lateral tunnel 17.

In the example illustrated in FIG. 1, no wood shrinkage will occur in the connection 1 between the nut 15 and the holding structure 2 because of the metal washer 52 and metal seat 5 which rests directly on concrete held structure 2. In many instances, however, the seat 5 of connector means 8 rests on a wood mud sill or other wood structural member which does shrink with time. In such case, the connection 1 can become loose unless nut 15 is tightened. Because of the inaccessibility of many connections 1, it is desirable to tighten the nut 15 automatically as wood shrinkage occurs.

The procedure for inserting the automatic take up means 62 illustrated in FIG. 4 as applied to the connection 1 as illustrated in FIG. 1 is as follows. Distal end 63 of elongated pull member 19 is inserted through narrow lateral tunnel 17 as illustrated in FIG. 1. Elongated pull member 19 is then pulled back slightly until an opening 20' is securely registered with a rotational driven member 16 such as a sprocket tooth, gear tooth or ratchet tooth on ring 64 used in conjunction with nut 15. Abutment end 60 of housing 25 is then placed in engagement with an outside face 68 of washer member 52. A latch (not shown) which holds compression spring 24 within housing 25 until ready for use is then unlatched so that distal end 59 of compression spring 24 now is in compression against bearing stop 23 formed on head 43 of elongated pull member 19. The automatic take up means 62 is now operative and will automatically rotate nut 15 should any looseness occur between the base 22 of nut 15, and base 35 of recess 11 of washer member 52.

Referring to FIGS. 5A, 5B, and 5C, an alternative nut 15' is illustrated which may replace the standard hex nut 15 illustrated in FIG. 1. As may be understood, the use of alternative nut 15' illustrated in FIG. 5 does not require a separate ring 64 of externally formed rotational driven members 16. Also, because of its broad planar base 66, alternative nut 15' can be used in some connections without using a separate washer 52.

Where no separate washer 52 is used, planar base 66 would bear directly against seat member 5 of concentric member 4 and top surface 87 would directly support base 37 of held structure 3. Either elongated pull member 19 or automatic take up means 62 can be used to rotate nut 15' illustrated in FIG. 5.

Nut rotational means 26 illustrated in FIGS. 6A, 6B and 6C may be used where the recess 11 in washer member 52 is properly sized in depth so that there is sufficient space between the base 37 of held structure 3 and the base 35 of recess 11 to accommodate nut rotational means 26 being placed on top of nut 15.

In operation, after hex nut 15 is threaded onto anchor bolt 13 and tightened down by finger pressure, nut rotational means 26 is placed over hex nut 15 so that inner walls 34 of the cap member 30 are in registration with the outer walls 33 of nut 15. At least one opening 20' in pull member 19 is then placed in registration with at least one externally formed cap rotational driven member 32 such as a ratchet, sprocket, or gear tooth. As explained above, elongated pull member 19 is then pulled one or more times until nut 15 is tight.

FIGS. 8A through 8E disclose an ingenious variation of the cap member 30 illustrated in FIGS. 6A, 6B, 6C, 7A, 7B, and 7C by disclosing an integral spiral hand pull device 40 which is a combination of the cap member 30 illustrated in FIGS. 6A–6C and elongated pull member 19 illustrated in FIGS. 2–4 by combining the cap member 30 and the pull member 19 into a single integrated unit. By making the integral spiral hand pull device 40 from a single plastic member which can be constructing by casting in a mold, the device 40 may be constructed so inexpensively that it may be actually used but a single time and the plastic recycled. In operation, integral spiral hand pull device 40 may be placed over a hex nut 15 in much the same way that cap member 30 is placed over nut 15.

Flange 80, illustrated in FIG. 8B, is joined to and extends from outer ring wall 57" to form outermost wall 83. Distal end 44' of spirally wound flexible elongated member 44 is joined to outermost wall 83. Lower face 81 of flange 80, as shown in FIG. 8D, rests upon upper annular face 82 of nut 15 as shown in FIG. 9A. A workman then grasps handle 45 and pulls linearly until the nut 15 is tightened. As the workman pulls, the weakened bonds between spoke fingers 48 and spokes 47 break one by one and then as the spirally wound flexible elongated member 44 unwinds, at each quarter turn the top edge of elongated member 44 breaks away from each of the respective spokes 47. As the nut 15 comes to a stop, the handle 45 and spirally wound flexible elongated member 44 either breaks off or may be cut off and the remainder of the integral spiral hand pull device 40 may be simply left in place or pulled away from the connection 1.

FIGS. 9A–9C illustrates another one of many examples that occur in the course of constructing a building where there is limited access to the nut 15 and the ability to tighten it. Often, this limited access results when a connection is easily accessed during construction, but then when another structure, such as a roof, is installed; the space between the rafters 69 and the nut 15 is so limited that a workman cannot reach the nut with standard tools to turn the nut 15 as when the connection 1' becomes loosened due to shrinkage of the wood structure such as the top wall plates 70.

There may not be enough room between the top of the threaded end portion 14 and the rafter 69 after the structure is built to insert either the cap members 30 illustrated in FIGS. 6A, 6B, and 6C or the integral spiral hand pull device 40 illustrated in FIGS. 9 and 10.

Where there is negligible distance between the end of the anchor member 13 and the roof structure as illustrated in FIGS. 9A–9C, the integral spiral hand pull device 40 as illustrated in FIGS. 8A–8E, is installed on the nut 15 before the roof, including rafters 69, sheathing 85 and shingles 86 is installed, as previously described.

The connection 1 of the present invention as illustrated in FIG. 1, also lends itself to the use of a worm gear bit 67 as illustrated in FIG. 10. Bit end 71 may be placed in a power drill and the worm gear configuration 72 is inserted through narrow lateral tunnel 17 and placed in registration with the rotational driven members 16 on ring 64 as illustrated in FIG. 1.

FIGS. 11A–11B illustrate another variation 15" of hex nut 15 illustrated in FIG. 1. Multistart threads are well known In the industry. Multistart threads may be one, two three and four starts. Multistart threads are placed on nuts or caps where maximum linear movement is desired for a given number of rotations. Most every peanut jar cap has multistart threads for quick access to the contents of the jar. In the present application, multistart threads are useful where maximum linear movement of the nut is desired for a minimum amount of linear pull on the elongated pull member 19 illustrated in FIGS. 2, 3, and 4 or by the integral spiral hand pull device 40 illustrated in FIGS. 8A–8E.

We claim:

1. A limited access building connection for connecting a holding structure and a held structure having a base comprising:

a. an anchor member adapted for connection to said holding structure and having a threaded end;

b. a nut having an inner threaded wall for threadably engaging said threaded end of said anchor member and having a base;

c. connector means adapted for engaging said base of said nut and adapted for connection to said held structure, including a washer member having an outer wall and formed with a recess having a recess wall and a recess base for registration with said base of said nut;

d. nut rotational means adapted for connection on the perimeter of said nut for imparting rotational motion to said nut and including a ring of externally formed rotational driven members formed to create ratchet teeth for one way rotation of said nut and the distance between the outermost lateral dimension of said ratchet teeth and said recess wall of said washer member is a distance only slightly greater than the width of said linear power means;

e. dimensional limited access parameters existent between said nut and said connector means and said held structure;

f. multiple pull linear power means dimensioned and configured to work within said dimensional limited access parameters and including a plurality of driving means for engaging said rotational driven members for imparting rotational motion to said nut;

g. said washer member is formed and dimensioned to receive said nut and said nut rotational means within said washer recess , said recess is formed with an opening in its upper end which is substantially covered by said base of said held structure preventing removal of said nut rotational means, said washer member is formed with a narrow lateral tunnel formed and dimensioned to receive said linear power means only therethrough and communicating between said outer wall and said recess wall providing the sole, direct sightline access of said linear power means to said rotational driven members and permitting engagement of said linear power means with said nut rotational means;

h. said multiple pull linear power means is an elongated pull member having a generally straight portion made from plastic:

i. said multiple pull linear power means is an elongated member made from a spring memory material which has sufficient longitudinal stiffness to be extended through said narrow lateral tunnel and into said recess, but having sufficient flexibility to be deflected and extended past said rotational driven members;

j. said multiple pull linear power means having sufficient spring memory to cause said elongated member to spring back to a generally straight portion wherein said driving means engage said rotational driven members for imparting one way rotational motion to said nut upon pulling said linear power means;

k. the length and width of said tunnel and the width of said elongated pull member are such that said pull member cannot be inserted beyond said ratchet teeth without bending of said multiple pull member; and l. said linear power means, said nut rotation means, and said dimensional access parameters are dimensioned and configured to permit said linear power means to be extended through said tunnel and pulled multiple times to effect one way rotation of said nut rotational means.

* * * * *